US008437644B2

United States Patent
Zhang et al.

(10) Patent No.: US 8,437,644 B2
(45) Date of Patent: May 7, 2013

(54) VESTIGIAL PHASE SHIFT KEYING MODULATION AND SYSTEMS AND METHODS INCORPORATING SAME

(75) Inventors: Hongbin Zhang, Marlboro, NJ (US); Carl R. Davidson, Warren, NJ (US); Jin-Xing Cai, Morganville, NJ (US); Yi Cai, Jackson, NJ (US)

(73) Assignee: Tyco Electronics Subsea Communications LLC, Eatontown, NJ (US)

( * ) Notice: Subject to any disclaimer, the term of this patent is extended or adjusted under 35 U.S.C. 154(b) by 165 days.

(21) Appl. No.: 13/033,084

(22) Filed: Feb. 23, 2011

(65) Prior Publication Data

US 2012/0213521 A1 Aug. 23, 2012

(51) Int. Cl.
*H04B 10/04* (2006.01)
(52) U.S. Cl.
USPC .......................................................... 398/188
(58) Field of Classification Search .................. 398/188, 398/198; 359/279
See application file for complete search history.

(56) References Cited

U.S. PATENT DOCUMENTS

| | | | |
|---|---|---|---|
| 8,073,338 B2 * | 12/2011 | Buelow | 398/184 |
| 8,090,270 B2 | 1/2012 | Zhang et al. | |
| 8,270,847 B2 | 9/2012 | Zhang et al. | |
| 8,306,418 B2 | 11/2012 | Cai et al. | |
| 2003/0175033 A1 * | 9/2003 | Taga et al. | 398/152 |
| 2005/0271394 A1 * | 12/2005 | Whiteaway et al. | 398/188 |
| 2006/0159466 A1 * | 7/2006 | Kim et al. | 398/188 |
| 2007/0206960 A1 * | 9/2007 | Nissov et al. | 398/188 |
| 2010/0232797 A1 | 9/2010 | Cai et al. | |
| 2010/0232809 A1 | 9/2010 | Cai et al. | |
| 2012/0093510 A1 | 4/2012 | Zhang et al. | |

OTHER PUBLICATIONS

Lyubomirsky, Ilya, "Quadrative Duobinary for High-Spectral Efficiency 100G Transmission", Journal of Lightwave Technology, Jan. 1, 2010, pp. 91-96, vol. 28, No. 1.

\* cited by examiner

*Primary Examiner* — Shi K Li
*Assistant Examiner* — Jamil Ahmed

(57) ABSTRACT

In general, optical communication systems and methods may implement a vestigial phase shift keying (PSK) modulation format to enable relatively high transmission rates with closer channel spacing and improved signal detection in a WDM optical communication system. A PSK modulated signal may be correlated with a phase shift, for example, using a delay line interferometer (DLI), to generate a vestigial PSK signal, which may be pre-filtered, combined, and transmitted in the WDM system. The correlation with a phase shift compresses and shifts the signal spectrum such that intersymbol interference (ISI) length may be reduced with minimal increase in the bit error rate (BER) when the vestigial PSK signal is detected.

20 Claims, 5 Drawing Sheets

VESTIGIAL PHASE SHIFT KEYING MODULATION AND SYSTEMS AND METHODS INCORPORATING SAME

CROSS-REFERENCE TO RELATED APPLICATIONS

The present application is related to U.S. patent application Ser. No. 13/032,982 which is filed concurrently herewith and fully incorporated herein by reference.

TECHNICAL FIELD

The present application relates to the optical transmission of information and more particularly, to vestigial phase shift keying (PSK) modulation and systems and methods incorporating the same.

BACKGROUND

Signals may be used to transmit data over distances. In optical communication systems, for example, data may be modulated on one or more optical wavelengths to produce modulated optical signals that may be transmitted over optical waveguides such as optical fibers. Optical communications systems have used techniques, such as wavelength division multiplexing (WDM) and various multi-level modulation formats, to increase the transmission capacity. In a multi-level modulation format, multiple data bits may be encoded on a single transmitted symbol. Multi-level modulation techniques have been used, for example, to allow increased transmission rates and decreased channel spacing, thereby increasing the spectral efficiency (SE) of each channel in a WDM system.

One type of modulation that may be used in optical communication systems is phase shift keying (PSK). According to different variations of PSK, data is transmitted by modulating the phase of an optical wavelength such that the phase or phase transition of the optical wavelength represents symbols encoding one or more bits. In a binary phase-shift keying (BPSK) modulation scheme, for example, two phases may be used to represent 1 bit per symbol. In a quadrature phase-shift keying (QPSK) modulation scheme, four phases may be used to encode 2 bits per symbol. In quadrature amplitude modulation (QAM), information may be modulated using a combination of phase shift keying and amplitude shift keying, for example, to encode multiple bits per symbol. A 16-QAM modulation format may be used, for example, to encode 4 bits per symbol. Other phase shift keying formats include differential phase shift keying (DPSK) formats and variations of phase shift keying and differential phase shift keying formats, such as return-to-zero DPSK (RZ-DPSK) and phase division multiplexed QPSK (PDM-QPSK).

In one example, a PDM-QPSK modulation format has been used successfully as a modulation format for 100 Gb/s transmission over 50 GHz channel spacing, i.e., a 200% SE. Reducing the channel spacing to 25 GHz or less would further improve the spectral efficiency (e.g., to 400% SE or higher) for a 100 Gb/s transmission. To avoid crosstalk from neighboring channels with such a reduction in channel spacing, the modulated optical signal should be passed through a narrow optical filter. One example of a higher multi-level modulation format capable of accomplishing these higher transmission rates with 400% SE is a 16-QAM modulation format. The 16-QAM modulation format, however, has a lower sensitivity (e.g. 4 dB less) than QPSK modulation format and is more sensitive to optical phase noise. Thus, 16-QAM with 400% SE has a limited transmission distance (e.g., around 1000 km).

Using a pre-filtered PDM-QPSK signal and narrow optical filters in an attempt to achieve these higher transmission rates with 400% SE is possible but presents unique challenges in the detection of the received PDM-QPSK signal. In some optical communications systems, the receivers include maximum-likelihood sequence estimation (MLSE) detectors using a Viterbi algorithm to detect and decode the modulated optical signals by determining the most probable input data sequence for the received signals. Long-length inter-symbol interference (ISI) generated by narrow optical filtering of the PDM-QPSK signal may prevent the implementation of the MLSE detector in real time. One attempt to reduce the ISI length by passing the QPSK signal through a one bit delay interferometer is described in co-pending U.S. patent application Ser. No. 12/905,717 filed on Oct. 15, 2010, which is fully incorporated herein by reference. The quadrature-duobinary (QDB)-QPSK signal generated using this technique has an ambiguity in the signal constellation, however, and thus caused an error event length longer than 2 symbols, which may increase bit error rate (BER).

BRIEF DESCRIPTION OF THE DRAWINGS

Reference should be made to the following detailed description which should be read in conjunction with the following figures, wherein like numerals represent like parts.

DETAILED DESCRIPTION

In general, optical communication systems and methods, consistent with the present disclosure, implement a vestigial phase shift keying (PSK) modulation format to enable relatively high transmission rates with closer channel spacing and improved signal detection in a WDM optical communication system. A PSK modulated signal may be correlated using a delay line interferometer (DLI) with a phase offset between two arms of the DLI to generate a vestigial PSK signal, which may be pre-filtered, combined, and transmitted in the WDM system. The phase shifted DLI compresses and shifts the signal spectrum such that intersymbol interference (ISI)

length may be reduced with minimal increase in the bit error rate (BER) when the vestigial PSK signal is detected.

The terms "PSK modulation" and "PSK modulated signal" as used herein refer to variations of a phase shift keying modulation scheme including, without limitation, binary phase shift keying (BPSK), quadrature phase shift keying (QPSK), differential phase shift keying (DPSK), differential quadrature phase shift keying DQPSK, other higher order nPSK schemes, variations of PSK schemes (e.g., RZ-DPSK), and other modulation schemes that use PSK, such as quadrature amplitude modulation (QAM). As used herein, "vestigial PSK" refers to modulation generated by correlating a PSK modulated signal with a phase shifted DLI such that the signal spectrum is compressed and asymmetric. As used herein, a "delay line interferometer" or "DLI" refers to an interferometer including two or more interferometer arms with a time delay on at least one arm relative to the other arm(s). The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

Figure 1:
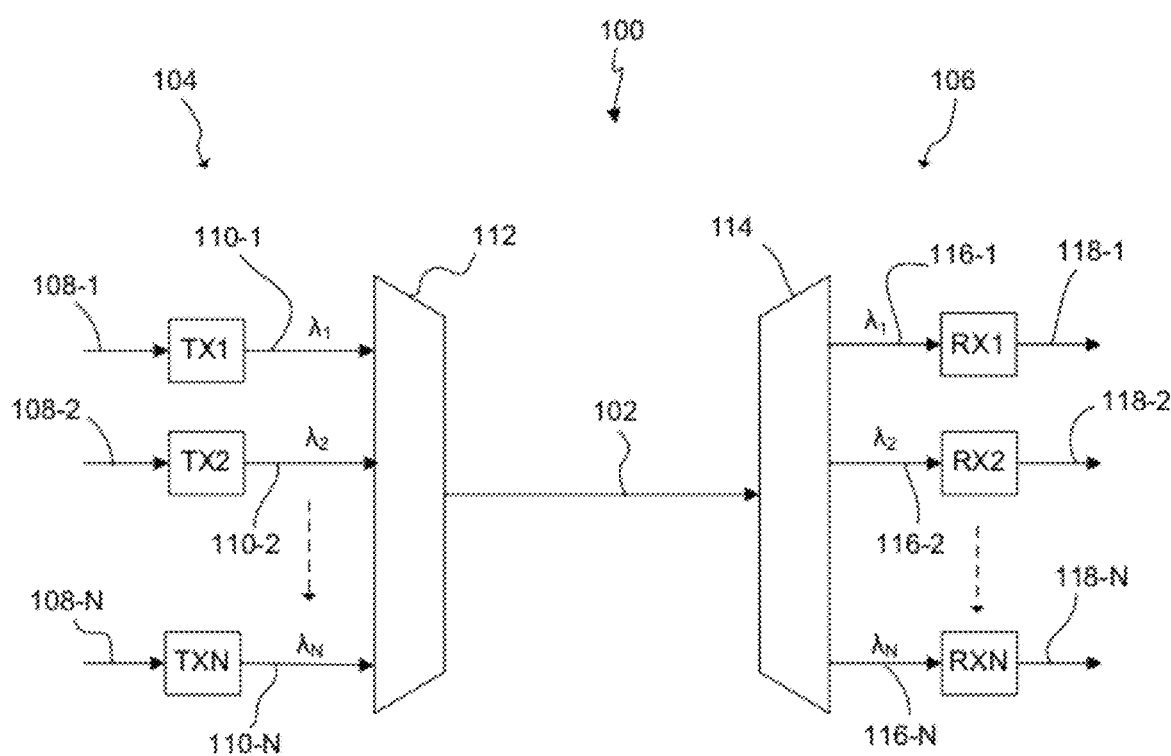
FIG. 1 is a simplified block diagram of one embodiment of a WDM optical communication system consistent with the present disclosure.

FIG. 1 is a simplified block diagram of one exemplary embodiment of a WDM optical communication system 100 consistent with the present disclosure. The optical communication system 100 transmits a plurality of optical channels over an optical information path 102 from a transmitting terminal 104 to one or more remotely located receiving terminals 106. The optical channels (1, 2, ... N) may be established based on a plurality of corresponding optical carrier wavelengths ($\lambda_1, \lambda_2 \ldots \lambda_N$) such that each channel has a spectral width centered on the respective carrier wavelength (or frequency). As used herein, channel wavelengths refer to the wavelengths associated with the respective channels and may include a band of wavelengths centered on the carrier wavelength associate with a channel.

In the exemplary embodiment, the WDM optical communication system 100 is a dense wavelength division multiplexed (DWDM) system having high spectral efficiencies, i.e., where the spectral width of constituent wavelength (frequency) carriers is larger than the actual frequency spacing among constituents. In example embodiments, the channels (1, 2, . . . . N) may have a spacing of 25 GHz, a transmission rate of 100 Gb/s, and a spectral efficiency of 4 bit/s/Hz or 400%. The systems and methods described herein may also have wider or narrower channel spacings, higher or lower transmission rates, and/or a higher or lower spectral efficiency.

The exemplary system 100 may be a long-haul submarine system configured for transmitting the channels from a transmitter to a receiver, for example, at a distance of 5,000 km, or more. The vestigial PSK modulation format, consistent with the present disclosure, may also be used in other optical communication systems such as terrestrial systems configured for transmitting from a transmitter to a receiver, for example, at distances in a range of about 2,000 km to 3,000 km. Although exemplary embodiments are described in the context of an optical system, and are useful in connection with a long-haul WDM optical system, the broad concepts discussed herein may be implemented in other communication systems transmitting and receiving other types of signals.

Those skilled in the art will recognize that the system 100 has been depicted as a highly simplified point-to-point system for ease of explanation. For example, the transmitting terminal 104 and receiving terminal 106 may both be configured as transceivers, whereby each may be configured to perform both transmitting and receiving functions. For ease of explanation, however, the terminals are depicted and described herein with respect to only a transmitting or receiving function. A system and method consistent with the disclosure may be incorporated into a wide variety of network components and configurations. The illustrated exemplary embodiments herein are provided only by way of explanation, not of limitation.

In the illustrated exemplary embodiment, a plurality of transmitters TX1, TX2 . . . TXN receive data signals on respective data paths 108-1, 108-2 . . . 108-N and transmit respective optical data signals by modulating the respective optical carrier wavelengths $\lambda_1, \lambda_2 \ldots \lambda_N$ associated with the channels (i.e., 1, 2, . . . N) with the data. One or more of the transmitters TX1, TX2 . . . TXN may be configured to modulate the associated optical carriers using a vestigial PSK modulation format, as will be described in greater detail below. The transmitters are shown in highly simplified form for ease of explanation. Each transmitter may include electrical and optical components configured for transmitting the optical signal at its associated wavelength with a desired amplitude and modulation.

The transmitted wavelengths or channels are respectively carried on a plurality of optical paths 110-1, 110-2 . . . 110-N. A multiplexer or combiner 112 combines the channel wavelengths including the modulated optical signals to form an aggregate WDM optical signal on the optical path 102. In one exemplary embodiment, the channel spacing between the combined channels may be 25 GHz or less. The modulated optical data signals may be filtered (e.g., either in the receivers or in the multiplexer/combiner 112) prior to being combined to form the aggregate WDM optical signals. The optical path 102 may include optical fiber waveguides, optical amplifiers, optical filters, dispersion compensating modules, and other active and passive components.

The aggregate WDM optical signal may be received at one or more remote receiving terminals 106. The receiving terminal 106 may include a demultiplexer 114 that separates the transmitted channels at channel wavelengths $\lambda_1, \lambda_2 \ldots \lambda_N$ onto associated paths 116-1, 116-2 . . . 116-N coupled to associated receivers RX1, RX2 . . . RXN. The receivers RX1, RX2 . . . RXN may be configured to demodulate the optical signals on the separated channels and provide associated output data signals on associated output data paths 118-1, 118-2 . . . 118-N. Each receiver may include electrical and optical components configured for receiving and demodulating the optical signal at its associated wavelength. In an example embodiment, the receivers may include a maximum-likelihood sequence estimation (MLSE) detector using a Viterbi algorithm to detect and decode the modulated optical signals by selecting known data patterns that are most likely to correspond to the received symbols. Other types of detectors or detection techniques may also be used, such as maximum aposteriori probability (MAP) detection described in greater detail in U.S. Patent Application Publication Nos. 2010/0232809, 2010/0232797, and 2010/0232796, which are incorporated herein by reference.

Figure 2:
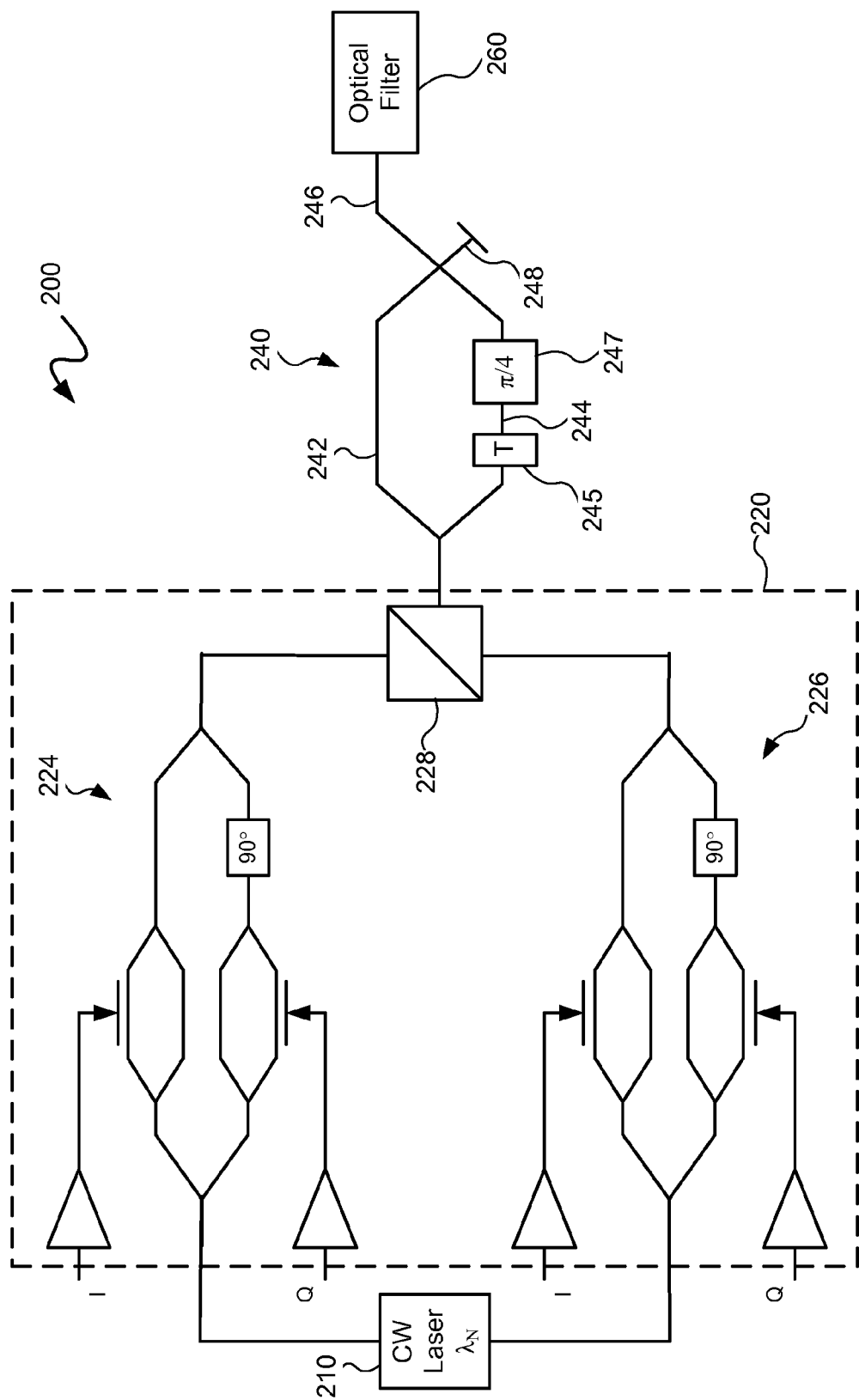
FIG. 2 is a simplified block diagram of one embodiment of a transmitter including a delay line interferometer (DLI) for providing vestigial PSK modulated signals, consistent with the present disclosure.

FIG. 2 is a simplified block diagram of one embodiment of a transmitter 200 consistent with the present disclosure. In general, the transmitter 200 includes at least one continuous wave laser 210 that provides a continuous wave optical carrier with a wavelength $\lambda_N$, a modulator 220 that modulates the optical carrier with data using a PSK modulation format, and a delay line interferometer (DLI) 240 that correlates a PSK modulated signal with a phase shift to produce a vestigial PSK modulated signal. In the example embodiment, the modulator 220 is a PDM-QPSK modulator that modulates the optical carrier using a PDM-QPSK modulation scheme. In other embodiments, the transmitter 200 may include other types of modulators to modulate using other PSK modulation schemes.

The transmitter 200 may also include an optical filter 260 for filtering the vestigial PSK modulated signal prior to combining with other vestigial PSK modulated signals. Alternatively or additionally, optical filtering may be provided in the multiplexer/combiner that combines the vestigial PSK modulated signal with the other signals at other channel wavelengths. The optical filtering may be provided, for example, using an arrayed waveguide grating (AWG) or optical interleaving filter, which also combine channel wavelengths in a WDM optical system.

The illustrated embodiment of the modulator 220 includes first and second IQ modulators 224, 226 coupled to a polarization beam combiner 228. The continuous wave laser 210 provides a continuous wave optical carrier with a wavelength $\lambda_N$, which is split and supplied to the respective first and second IQ modulators 224, 226. Multiple lasers may also be used to generate first and second optical carriers at the same carrier wavelength 4 for the respective first and second IQ modulators 224, 226. The first and second IQ modulators 224, 226 each modulate the carrier wavelength $\lambda_N$ with in-phase (I) and quadrature-phase (Q) components of a binary data stream and generate first and second QPSK signals. The PBC 228 combines the first and second QPSK signals with different polarizations (e.g., orthogonal polarizations). In another embodiment, the modulator 220 may be a QPSK modulator with only one IQ modulator and without a PBC.

The first and second IQ modulators 224, 226 may each include nested Mach-Zehnder modulators that modulate the carrier wavelength 4 with the respective I and Q components of the data stream. In particular, the first IQ modulator 224 splits the incoming light into two paths. The first IQ modulator 224 modulates the carrier wavelength on one path with the I component data stream to generate an in-phase optical signal component (i.e., with a phase of 0°). The first IQ modulator 224 also modulates the optical carrier wavelength on the other path with the Q component data stream to generate a quadrature-phase optical signal component that is out of phase with the in-phase component by $\pi/2$ (90°). The in-phase and quadrature-phase optical signal components are coupled at an output of the IQ modulator 224 to produce a QPSK signal modulated on the carrier wavelength $\lambda_N$. The second IQ modulator 226 similarly modulates the optical carrier with I and Q component data streams to generate in-phase and quadrature-phase signal components. The QPSK signal outputs of the first and second IQ modulators 224, 226 are coupled to the PBC 228 and combined to form the PDM-QPSK signal. The modulator 220 may also include other configurations to produce PDM-QPSK modulation.

The PDM-QPSK signal output from the PBC 228 is coupled to the DLI 240 for correlation to produce the vestigial QPSK signal. In the illustrated embodiment, the DLI 240 includes at least first and second interferometer arms 242, 244, a constructive port 246, and a destructive port 248. The DLI 240 provides a one bit time delay on one of the arms 242, 244 and provides a phase shift between the arms 242, 244. In the illustrated embodiment, the interferometer arm 244 includes a time delay element 245 and a phase shift element 247. In other embodiments, the time delay element 245 and phase shift elements 247 may be located on either of the interferometer arms 242, 244 together or separately. A PSK modulated signal (e.g., the PDM-QPSK modulated signal from the illustrated embodiment of the modulator 220) is split between the arms 242, 244 of the DLI 240 such that the PSK modulated signal is correlated with a phase shift between the arms 242, 244 to produce the vestigial PSK modulated signal at the constructive port 246.

Although the transmitter 200 is shown in FIG. 2 with a single stage DLI 240 providing a 2-tap correlation, the transmitter 200 may also include a two stage DLI providing a 3-tap correlation, for example, as disclosed in co-pending U.S. patent application Ser. No. 12/905,717 filed on Oct. 15, 2010, which is commonly-owned and fully incorporated herein by reference. One or both of the arms 242, 244 of the DLI 240 (or a second stage DLI) may also include an attenuator to provide further control over the correlation.

The DLI 240 introduces a correlation property into the transmitted symbols in the PSK modulated signal, which effectively compresses the signal spectrum. The transmitted signal spectrum has the form represented by Equation 1:

$$\Phi_x(f) \propto |G(f)|^2 \Phi_i(f) \qquad (1)$$

where G(f) is the Fourier transform of pulse function and $\Phi_i(f)$ is the power density function of the information sequence as defined in Equation 2:

$$\Phi_i(f) = \sum_{m=-\infty}^{\infty} \phi_i(m) e^{-2\pi f mT} \qquad (2)$$

where $\Phi_i$(m) is the autocorrelation function of the information sequence $\{I_i\}$. Adding the correlation property into the information sequence generates a desired power density function $\phi_i(f)$ and thus compresses the signal spectrum.

Without the phase shift in the DLI 240 shown in FIG. 2, for example, a 2-tap correlation generated by the DLI 240 has an information sequence as represented in Equation 3:

$$I_n = b_n + b_{n-1} \qquad (3)$$

where $\{b_n\}$ is an independent QPSK sequence. The power density function of this information sequence is represented by Equation 4:

$$\Phi_i(f) = 2 + 2 \cos(2\pi fT) \qquad (4)$$

This 2-tap correlation of a PDM-QPSK signal results in a quadrature-duobinary (QDB)-QPSK modulation. Such a 2-tap correlation of the PDM-QPSK signal maintains a relatively short ISI length as compared to a non-correlated PDM-QPSK signal after passing through narrow optical filters, for example, as described in greater detail in co-pending U.S. patent application Ser. No. 12/905,717. Although the QDB-QPSK modulation compresses the signal spectrum (see FIG. 4), the signal constellation for the QDB-QPSK modulation has only 9 points for one pair of QPSK signals (see FIG. 5A). As a result of this ambiguity in the QDB-QPSK signal constellation, the error event length is longer than 2 symbols when detecting and decoding the QDB-QPSK signal in a receiver using MLSE detection, which increases the bit error rate (BER) and adversely affects performance.

Consistent with the present disclosure, the DLI 240 provides a phase shift between the interferometer arms 242, 244, which modifies the second correlation tap and reduces the error event length to 2 symbols. In one example, the phase shift is $\pi/4$ such that the second correlation tap coefficient is modified from 1 to $\exp(j \pi/4)$ and the 2-tap correlation signal has an information sequence as represented in Equation 5:

$$I_n = b_n + e^{\pm j\pi/4} b_{n-1} \qquad (5)$$

Figure 3:
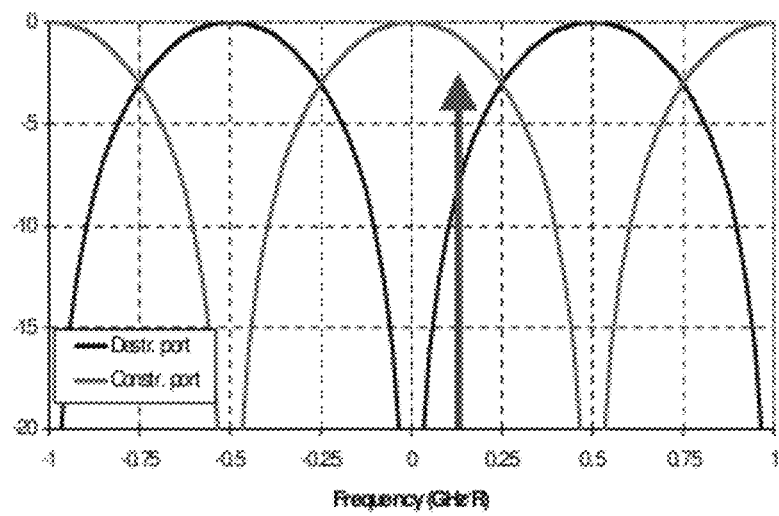
FIG. 3 is a graph illustrating the constructive port and destructive port optical transfer function of the DLI shown in FIG. 2 with the carrier frequency of the laser offset from the center of the DLI by ⅛ of the free spectral range (FSR).

The modified 2 tap correlation coefficient is thus realized by shifting the laser carrier frequency relative to the center of the DLI 240 by ±⅛ of the free spectral range (FSR). FIG. 3 illustrates the constructive port and destructive port optical transfer function of the DLI 240 with the carrier frequency of the laser 210 offset from the center of the DLI 240 by ⅛ FSR.

The relationship between the laser frequency offset and the phase shift between the arms 242, 244 of the DLI 240 may be represented by Equation 6:

$$\phi = 2\pi \frac{\Delta f}{FSR} \quad (6)$$

Thus, the power density function of the information sequence for the modified 2-tap correlation signal may be represented by Equation 7:

$$\Phi_i(f) = 2 + 2\cos\left(2\pi fT - \frac{\pi}{4}\right) \quad (7)$$

Although the example embodiment described herein provides a π/4 phase shift between the arms 242, 244 of the DLI 240, other phase shifts may also be used within the scope of this disclosure.

Figure 4:
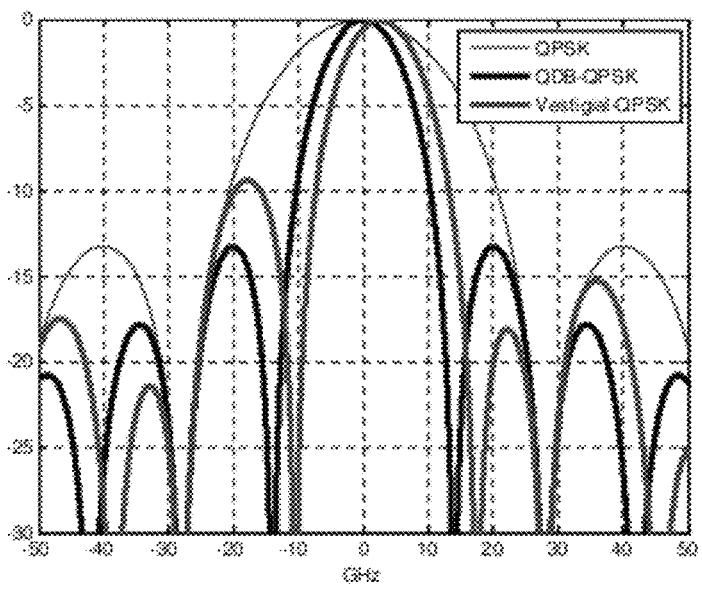
FIG. 4 is a graph illustrating a comparison of signal spectrums for a vestigial QPSK signal, a quadrature duobinary (QDB)-QPSK signal, and a QPSK signal.

This modified 2-tap correlation of a PDM-QPSK signal results in a vestigial QPSK modulation. As shown in FIG. 4, the signal spectrum of both a QDB-QPSK signal and a vestigial QPSK signal is compressed relative to the signal spectrum of a QPSK signal. In the illustrated example, the main lobe of the signal spectrum is reduced from about 28 GHz for the QPSK signal to about 14 GHz for the PDM-QPSK signal and the vestigial QPSK signal. This compression of the signal spectrum maintains the relatively short ISI length, as discussed above. FIG. 4 also shows that the signal spectrum of the vestigial QPSK signal is not symmetric as a result of the modified correlation coefficient, exp(j π/4). This asymmetry results in a change in the signal constellation and an improved detection of the signal, as discussed below.

Figure 5A:
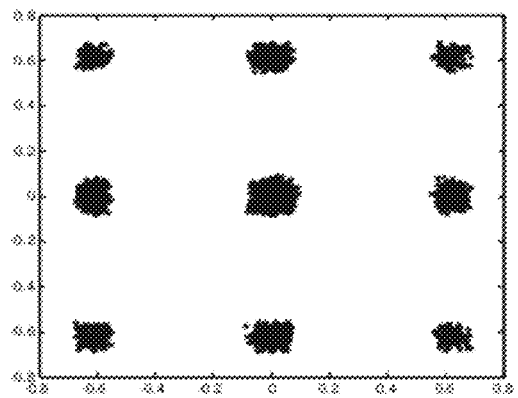
FIGS. 5A and 5B are signal constellation diagrams of a QDB-QPSK signal and a vestigial QPSK signal, respectively.
Figure 5B:
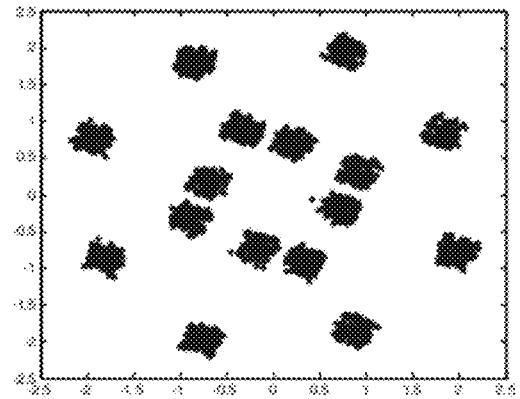
Figure 6A:
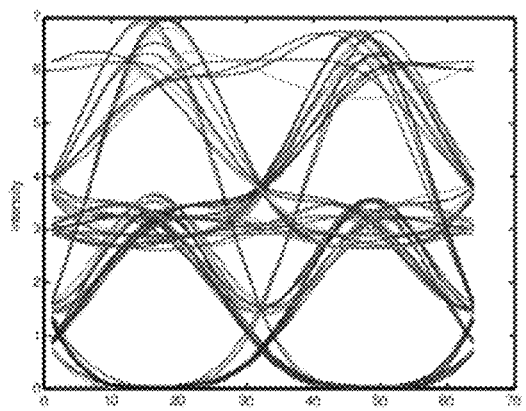
FIGS. 6A and 6B are eye diagrams of a QDB-QPSK signal and a vestigial QPSK signal, respectively.
Figure 6B:
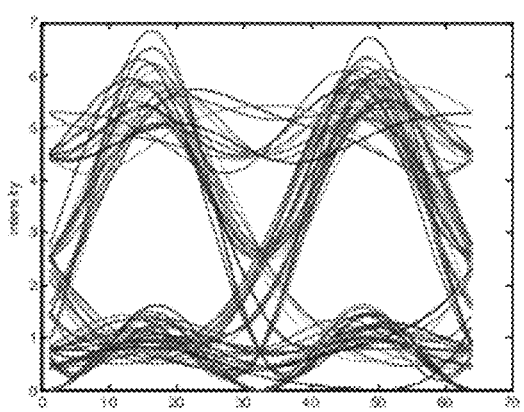
Figure 7:
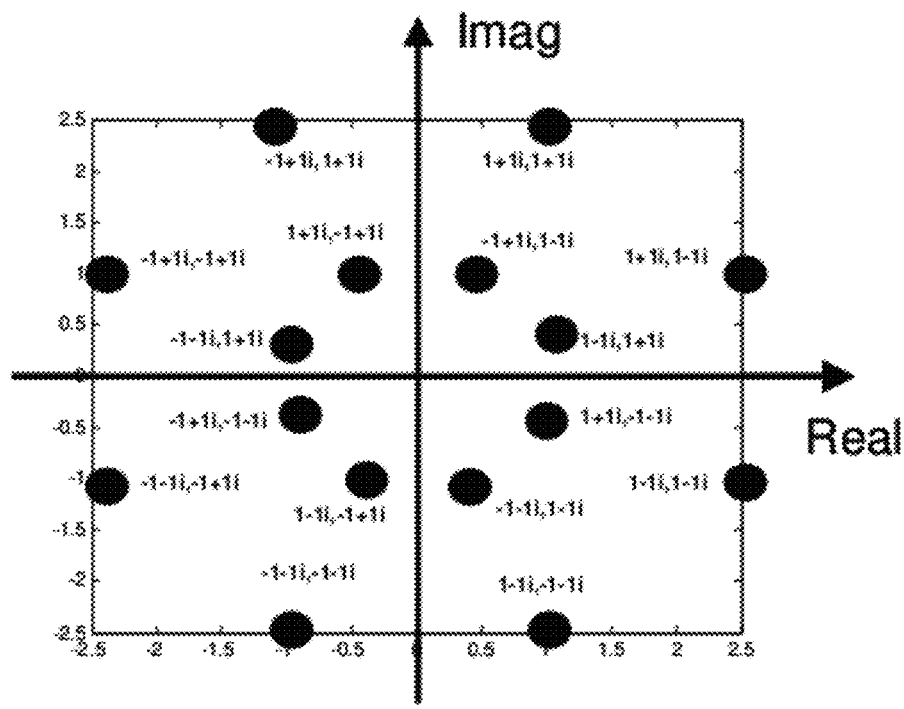
FIG. 7 is a constellation map of a vestigial QPSK signal illustrating each point mapped to a unique QPSK pair.

FIGS. 5A, 5B, 6A, 6B and 7 further illustrate differences between the vestigial QPSK signal and a QDB-QPSK signal. As shown in FIGS. 5A and 5B, the signal constellation of the QDB-QPSK signal has 9 points and the signal constellation of the vestigial QPSK signal has 16 points, which is the same as 2 circular 16-QAM. FIG. 7 illustrates each constellation point of a vestigial QPSK signal mapped to one unique QPSK pair. As shown in FIGS. 6A and 6B, the eye diagram for the vestigial QPSK signal is simplified as compared to the eye diagram of the QDB-QPSK signal.

Figure 8:
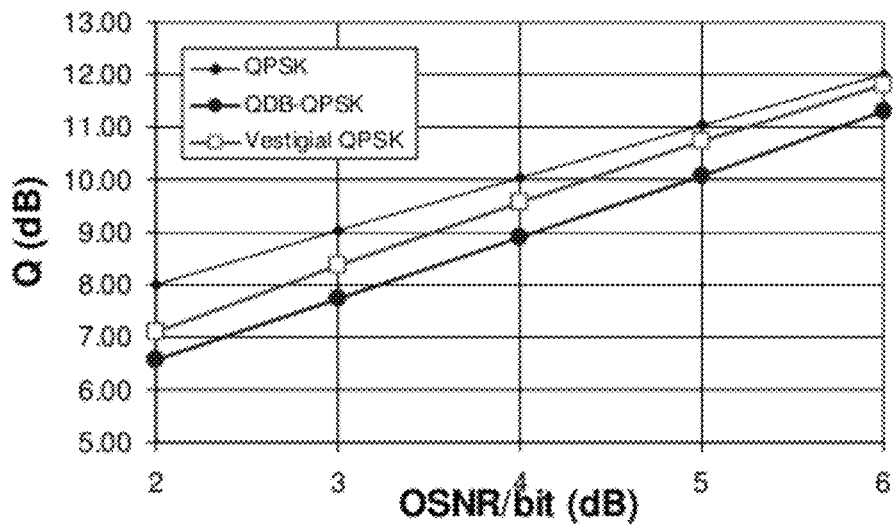
FIG. 8 is a plot of the Q factor versus the optical signal to noise ratio (OSNR) per bit illustrating back-to-back performance of a vestigial QPSK signal, a QDB-QPSK signal, and a QPSK signal.

FIG. 8 shows a plot of the Q factor for the optical signal to noise ratio (OSNR) per bit for back-to-back transmissions of theoretical QPSK, QDB-QPSK and vestigial QPSK signals and illustrates the performance advantages of the vestigial QPSK signal as compared to the QDB-QPSK signal. In back-to-back transmission, the QPSK signal has an error event length of 1 symbol, the vestigial QPSK signal has an error event length of 2 symbols, and the QDB-QPSK signal has an error event length that is longer than 2 symbols. Thus, the vestigial QPSK has a lower bit error rate (BER) than the QDB-QPSK signal and a higher Q factor for a given OSNR/bit. Although there is a performance degradation resulting from the main lobe of the signal spectrum for both QDB-QPSK and vestigial QPSK being suppressed to about ½ the main lobe of the signal spectrum for the QPSK signal, the performance degradation is relatively small (e.g., as compared to 16-QAM, which is not shown).

Accordingly, vestigial PSK modulation, and particularly vestigial QPSK modulation, may improve spectral efficiency in WDM optical communication systems with less impact on the detection of the signals in a receiver using MLSE detection. In particular, the vestigial PSK modulation may provide a relatively small ISI length after pre-filtering without increasing the error event length longer than 2 symbols.

According to one aspect of the disclosure, an optical communication method includes: modulating at least one optical carrier at a channel wavelength with data using phase shift keying (PSK) modulation to provide at least one PSK modulated signal; correlating the PSK modulated signal using a delay line interferometer, wherein the delay line interferometer provides a phase shift between arms of the delay line interferometer to produce at least one vestigial PSK modulated signal; and transmitting the at least one vestigial PSK modulated signal over an optical transmission path.

According to another aspect of the disclosure, an optical transmitter includes at least one modulator configured to modulate an optical carrier at a channel wavelength with data using PSK modulation to generate a PSK modulated signal and at least one delay line interferometer configured to correlate the PSK modulated signal. The delay line interferometer is configured to provide a one bit delay between arms of the delay line interferometer and to provide a phase shift between the arms to produce a vestigial PSK modulated signal.

According to another aspect of the disclosure, an optical communication system includes a transmitting terminal configured to modulate a plurality of optical carriers at different channel wavelengths with a plurality of respective data streams using PSK modulation to produce PSK modulated optical signals, configured to correlate the PSK modulated optical signals with a phase shift to produce vestigial PSK modulated optical signals, configured to filter the vestigial PSK modulated optical signals, and configured to combine the vestigial PSK modulated optical signals into an aggregate WDM optical signal including multiple channels. The optical communication system also includes an optical path configured to carry the WDM optical signal and a receiving terminal configured to separate the vestigial PSK modulated optical signals on the transmitted channels at the associated wavelengths in the WDM optical signal, and configured to detect and decode the vestigial PSK modulated optical signals to provide associated output data signals, respectively.

The embodiments that have been described herein but some of the several which utilize a system or method consistent with the present disclosure and are set forth herein by way of illustration but not of limitation. Many other embodiments, which will be readily apparent to those skilled in the art, may be made without departing materially from the spirit and scope of the disclosure.

What is claimed is:

1. An optical communication method comprising:
    modulating at least one optical carrier at a channel wavelength with data using phase shift keying (PSK) modulation to provide at least one PSK modulated signal;
    correlating the PSK modulated signal using a delay line interferometer, wherein the delay line interferometer splits the PSK modulated signal between arms of the delay line interferometer and provides a phase shift between the arms of the delay line interferometer to produce at least one vestigial PSK modulated signal at a constructive port of the delay line interferometer; and
    transmitting the at least one vestigial PSK modulated signal over an optical transmission path.

2. The optical communication method of claim 1 wherein the delay line interferometer provides a $\pi/4$ phase shift between the arms of the delay line interferometer such that a laser frequency is offset from a center of the delay line interferometer by 1/8 FSR.

3. The optical communication method of claim 1 wherein the delay line interferometer provides a one bit delay on one of the arms of the delay line interferometer.

4. The optical communication method of claim 1 further comprising:
filtering the vestigial PSK signal prior to transmitting the vestigial PSK signal over the optical transmission path.

5. The optical communication method of claim 4 wherein a plurality of different channel wavelengths are modulated with a plurality of data streams to provide a plurality of PSK signals at the different channel wavelengths, and wherein a plurality of vestigial PSK signals are produced by correlating the plurality of PSK signals, and wherein the plurality of vestigial PSK signals are each filtered, and further comprising:
combining the plurality of vestigial PSK signals after filtering and prior to transmitting over the optical transmission path.

6. The optical communication method of claim 1 further comprising:
receiving the vestigial PSK signal; and
detecting and decoding the vestigial PSK signal using multi-symbol detection.

7. The optical communication method of claim 6 wherein the vestigial PSK signal is detected and decoded by performing maximum-likelihood sequence estimation (MLSE) using a Viterbi algorithm.

8. The optical communication method of claim 1 wherein the PSK modulated signal is a quadrature phase shift keying (QPSK) modulated signal.

9. The optical communication method of claim 8 wherein the PSK modulated signal is a polarization division multiplexed (PDM) QPSK modulated signal.

10. An optical transmitter comprising:
at least one modulator configured to modulate an optical carrier at a channel wavelength with data using PSK modulation to generate a PSK modulated signal; and
at least one delay line interferometer configured to correlate the PSK modulated signal, wherein the delay line interferometer is configured to split the PSK modulated signal between arms of the delay line interferometer, to provide a one bit delay between the arms of the delay line interferometer and to provide a phase shift between the arms to produce a vestigial PSK modulated signal at a constructive port of the delay line interferometer.

11. The optical transmitter of claim 10 further comprising an optical filter configured to filter the vestigial PSK modulated signal.

12. The optical transmitter of claim 10 wherein the PSK modulation is QPSK modulation.

13. The optical transmitter of claim 10 wherein the PSK modulation is PDM-QPSK modulation.

14. The optical transmitter of claim 10 wherein the delay line interferometer includes a phase shift element on one of the arms and a time delay element on one of the arms.

15. The optical transmitter of claim 10 wherein the phase shift is $\pi/4$.

16. An optical communication system comprising:
a transmitting terminal comprising:
a plurality of modulators configured to modulate a plurality of optical carriers at different channel wavelengths with a plurality of respective data streams using PSK modulation to produce PSK modulated optical signals;
a plurality of delay line interferometers configured to split respective ones of the PSK modulated optical signals between interferometer arms to correlate the PSK modulated optical signals with a phase shift to produce vestigial PSK modulated optical signals at respective constructive ports of the delay line interferometers;
filters configured to filter the vestigial PSK modulated optical signals; and
a multiplexer configured to combine the vestigial PSK modulated optical signals into an aggregate WDM optical signal including multiple channels;
an optical path configured to carry the WDM optical signal; and
a receiving terminal configured to separate the vestigial PSK modulated optical signals on the transmitted channels at the associated wavelengths in the WDM optical signal, and configured to detect and decode the vestigial PSK modulated optical signals to provide associated output data signals, respectively.

17. The optical communication system of claim 16 wherein the PSK modulation is QPSK modulation to produce QPSK modulated optical signals.

18. The optical communication system of claim 16 wherein the PSK modulation is PDM-QPSK modulation to produce PDM-QPSK modulated optical signals.

19. The optical communication system of claim 16 wherein the delay line interferometers provide a $\pi/4$ phase shift between the interferometer arms.

20. The optical communication system of claim 16 wherein the receiving terminal is configured to detect and decode the vestigial PSK modulated optical signal by performing maximum-likelihood sequence estimation (MLSE) using a Viterbi algorithm.

* * * * *